US012404381B2

(12) United States Patent
Pineau et al.

(10) Patent No.: US 12,404,381 B2
(45) Date of Patent: Sep. 2, 2025

(54) METHOD FOR MAKING A CARBON FIBRE FROM A PAPER PRODUCT

(71) Applicants: INSTITUT DE RECHERCHE TECHNOLOGIQUE JULES VERNE, Bouguenais (FR); CENTRE TECHNOLOGIQUE NOUVELLE-AQUITAINE COMPOSITES & MATERIAUX AVANCES, Pessac (FR); FAURECIA SERVICES GROUPE, Nanterre (FR)

(72) Inventors: Sylvain Pineau, Mont de Marsan (FR); Célia Mercader, Talence (FR); Céline Largeau, Le Loroux Bottereau (FR)

(73) Assignees: INSTITUT DE RECHERCHE TECHNOLOGIQUE JULES VERNE, Bouguenais (FR); CENTRE TECHNOLOGIQUE NOUVELLE-AQUITAINE COMPOSITES & MATERIAUX AVANCES, Pessac (FR); FAURECIA SERVICES GROUPE, Nanterre (FR)

(*) Notice: Subject to any disclaimer, the term of this patent is extended or adjusted under 35 U.S.C. 154(b) by 911 days.

(21) Appl. No.: 17/610,053

(22) PCT Filed: May 7, 2020

(86) PCT No.: PCT/EP2020/062658
§ 371 (c)(1),
(2) Date: Nov. 9, 2021

(87) PCT Pub. No.: WO2020/229282
PCT Pub. Date: Nov. 19, 2020

(65) Prior Publication Data
US 2022/0259393 A1  Aug. 18, 2022

(30) Foreign Application Priority Data

May 10, 2019 (FR) ..................... 1904850

(51) Int. Cl.
C08J 5/24 (2006.01)
C01B 32/05 (2017.01)
C08J 5/04 (2006.01)
D01F 9/16 (2006.01)
D01F 13/02 (2006.01)
D21H 13/50 (2006.01)

(52) U.S. Cl.
CPC ............... *C08J 5/243* (2021.05); *C01B 32/05* (2017.08); *C08J 5/042* (2013.01); *D01F 9/16* (2013.01); *D01F 13/02* (2013.01); *D21H 13/50* (2013.01); *Y02P 70/62* (2015.11)

(58) Field of Classification Search
CPC . C08J 5/243; C08J 5/042; C01B 32/05; D01F 9/16; D01F 13/02; Y02P 70/62
See application file for complete search history.

(56) References Cited

U.S. PATENT DOCUMENTS

| | | |
|---|---|---|
| 5,601,767 A | 2/1997 | Firgo et al. |
| 5,804,120 A | 9/1998 | Boerstoel et al. |
| 5,817,801 A | 10/1998 | Boerstoel et al. |
| 11,578,433 B2* | 2/2023 | Mercader .............. D01D 1/106 |
| 2015/0292118 A1* | 10/2015 | Korzhenko .............. D01F 2/00 |
| | | 423/447.2 |

FOREIGN PATENT DOCUMENTS

| | | | |
|---|---|---|---|
| CA | 2348279 A1 * | 11/2001 | ............. B29C 53/60 |
| EP | 2 947 200 | 11/2015 | |
| FR | 2 997 097 | 4/2014 | |
| GB | 860342 | 2/1961 | |
| WO | 85/05115 A1 | 11/1985 | |
| WO | WO-9606208 A1 * | 2/1996 | ............. C08B 1/003 |
| WO | 2010/104458 | 9/2010 | |
| WO | 2014/162062 | 10/2014 | |
| WO | 2018/142025 | 8/2018 | |

OTHER PUBLICATIONS

International Search Report and Written Opinion of the ISA for PCT/EP2020/062658 dated Jul. 20, 2020, 13 pages.
Boerstoel et al., "Liquid crystalline solutions of cellulose in phosphoric acid," Polymer, 2001, Vo. 42, bp. 7371-7379.
Swatloski et al., "Dissolution of Cellose with Ionic Liquids," Journal of the American Chemical Society (JACS), 2002, vol. 124, pp. 4974-4975.

\* cited by examiner

*Primary Examiner* — Patrick D Niland
(74) *Attorney, Agent, or Firm* — NIXON & VANDERHYE

(57) ABSTRACT

Disclosed is a method for making a carbon fibre from a paper product. The method includes preparing a cellulose-based fibre by crushing the paper product, dissolving the crushed material obtained in an aqueous phosphoric acid solution to form a spinning solution, and forming a cellulose-based continuous fibre by use of a solvent spinning process. The cellulose fibre formed in this way is subjected to carbonisation treatment in order to form a carbon fibre.

20 Claims, No Drawings

METHOD FOR MAKING A CARBON FIBRE FROM A PAPER PRODUCT

CROSS-REFERENCE TO RELATED APPLICATIONS

This application is the U.S. national phase of International Application No. PCT/EP2020/062658 filed May 7, 2020 which designated the U.S. and claims priority to FR Patent Application No. 1904850 filed May 10, 2019, the entire contents of each of which are hereby incorporated by reference.

BACKGROUND OF THE INVENTION

Field of the Invention

The present invention falls within the general field of manufacturing carbon fibres, in particular intended for the preparation of composite materials, from biosourced materials.

More particularly, the present invention relates to a method for manufacturing a carbon fibre from a paper product. The invention further relates to a more general method of manufacturing an article made of composite material based on carbon fibres distributed in an organic polymer resin matrix, comprising implementing a method for manufacturing a carbon fibre according to the invention.

Description of the Related Art

Carbon fibres are used in many fields taking advantage of their particularly advantageous mechanical, electrical and thermal properties and low weight.

The manufacture of carbon fibres from renewable biosourced materials, in order to avoid the problem of anticipated depletion of fossil resources, has been the subject of much research in recent decades. In particular, the prior art has proposed manufacturing such fibres from cellulose, a macromolecular carbohydrate from which the wall of plant cells is made and which is the main component of wood. Cellulose is the most abundant organic material on Earth. Carbon fibres obtained from cellulose have the particular advantage of very good structuring.

The present invention aims to provide a method for manufacturing, from cellulose, at a low cost and in the most environmentally-friendly way possible, continuous carbon fibres with sufficiently good mechanical properties to be used for many applications, and in particular for the manufacture of articles made of composite materials.

In order to achieve this objective, the present inventors have been looking into the paper recycling industry.

More specifically, paper is made up for about 70-85% of cellulose fibres extracted from wood or recycled paper. The remaining 15-30% are additives of the mineral filler type, mainly consisting of carbonates, and various additives such as adhesives, starches, pigments, etc., which were added during the manufacture of the paper to give it specific properties.

A very large amount of paper is currently consumed worldwide, in particular for the manufacture of paper products such as printing paper, packaging, sanitary and household paper, but also for hygiene and medical products. The recycling of paper products, in particular waste paper products, is thus of great interest, both ecologically and economically, in particular in the context of the manufacture of carbon fibres. The cost price of waste paper is indeed much lower than that of the conventional precursor materials used to manufacture carbon fibres, such as purified cellulose, in particular from the paper industry, or polyacrylonitrile.

The document WO 2018/142025 describes a method for preparing cellulose fibres that can be used as precursors for carbon fibres, from everyday cellulosic waste. The method comprises an initial step of treating the waste by cooking in an alkaline glycerol liquor, then the dissolving of the resulting cellulose pulp in an ionic liquid, and the spinning of the resulting solution to form a cellulose fibre.

The document WO 2014/162062 describes a method for producing cellulose fibres from a lignocellulosic material. This method comprises dissolving the material in a specific solvent, a diazabicyclononene-based ionic liquid, and spinning the resulting solution to form a cellulose fibre.

The document U.S. Pat. No. 5,601,767 describes a method for producing cellulose fibres from paper, comprising dissolving ground paper in an aqueous amine oxide solution, removing water by drying at a high temperature, and forming a cellulose fibre by solvent spinning. However, there is no mention in this document that this cellulose fibre can be used to form carbon fibres.

SUMMARY OF THE INVENTION

The present inventors have discovered that the cellulose contained in manufactured paper products can be recovered in a sufficiently little degraded form to be able to be used in a conventional spinning process, usually applied to paper cellulose pulp, so as to form individual and continuous cellulose-based fibres, which cellulose-based fibres can then undergo carbonisation to obtain carbon fibres with quite satisfactory mechanical properties, and with a good carbon yield during the carbonisation step. More particularly, the present inventors have discovered that such a result can be obtained, under specific operating conditions, with a minimum number of steps, and in particular without implementing pre-treatment steps such as the cooking, washing, pulping, etc., of the manufactured product or of the cellulose contained therein, prior to the spinning step, and without requiring a significant temperature input, other than for the carbonisation step itself, contrary to what is recommended by the prior art as regards the manufacture of cellulose fibre precursors for carbon fibres. These carbon fibres can be used in particular to manufacture composite materials.

The present invention thus proposes a method for manufacturing a carbon fibre by recycling a paper product.

In the present description, the term "paper product" is understood to mean any manufactured product made from paper pulp, for example, but not limited to, office or printing paper products, including sheets and envelopes, paper towels, paper tissues, toilet paper, paper napkins, etc.

The term "paper product" does not include the pulp obtained directly from wood by the chemical or mechanical processes implemented in the paper industry.

The manufactured product which the method according to the invention uses can be both new or used and can in particular be at the end of its life.

The method for manufacturing a carbon fibre according to the invention comprises, after a step of collecting the paper product:

a/ preparing a cellulose-based fibre, comprising the successive steps of:

a1/ grinding/shredding this paper product, so as to obtain a ground paper material;

a3/ directly dissolving the ground material obtained at the end of step a1/ in an aqueous phosphoric acid solution acting as a solvent solution, in which the cellulose is soluble, to form a so-called spinning solution;

a4/ using this spinning solution to manufacture a cellulose-based continuous fibre by implementing a solvent spinning process, also commonly referred to as a wet spinning process;

a5/ where appropriate, drawing the resulting cellulose-based continuous fibre so as to form a fibre of greater length, the implementation of such a drawing step being particularly preferred within the scope of the invention;

b/ and carbonising the resulting cellulose-based continuous fibre to form a carbon fibre.

The phrase "directly dissolving the ground material in an aqueous phosphoric acid solution" is understood herein to mean that the ground material obtained at the end of step a1/ is directly dissolved, as it is, in the aqueous solution, without being subjected to one or more prior treatment steps.

The solvent spinning process, or wet spinning process, implemented in step a4/ of the method according to the invention consists, in a conventional manner in itself, of extruding the spinning solution through a spinneret, in a so-called coagulation bath containing a non-solvent for the cellulose, which is miscible with the solvent solution, i.e. the aqueous phosphoric acid solution, used to prepare the spinning solution.

The solvent spinning process implemented according to the invention can be a so-called "wet" process, according to which the spinneret is immersed in the coagulation bath, or a so-called "dry-jet" process, according to which the spinneret is placed at a distance, generally comprised between 1 mm and 20 cm, above the coagulation bath.

The method for manufacturing a carbon fibre according to the invention is simple to implement, and each of the steps thereof can be carried out by techniques known to a person skilled in the art. Carbon fibres can be formed, in an extremely small number of steps, which carbon fibres have good properties, in particular mechanical properties, and at a particularly advantageous cost that is much lower than that required to manufacture carbon fibres using conventional precursor materials, such as, for example, purified cellulose from the paper industry, or polyacrylonitrile.

In particular, the method according to the invention, comprising a step of preparing a cellulose-based continuous fibre, which induces a rearrangement of the molecular structures within the fibre, resulting in a crystalline structure of the cellulose within the fibre, allows a final carbon fibre with very good mechanical properties to be obtained. In particular, the method according to the invention procures carbon fibres with a tensile strength of greater than 1,200 MPa and a Young's modulus of greater than 75 GPa, and even a tensile strength of greater than or equal to 2,500 MPa and a Young's modulus of greater than or equal to 200 GPa after graphitisation. These mechanical properties make them suitable for use in fields of application where a high strength of the materials is required. Nothing in the prior art suggested that such satisfactory mechanical properties could have been obtained with such a small number of steps, i.e., grinding the manufactured paper product, dissolving the ground material, without any other pre-treatment, in the aqueous phosphoric acid solution, and solvent spinning the resulting solution.

More generally, the carbon fibres obtained by the manufacturing method according to the invention can be used in many fields, in particular to produce materials or parts intended to be used in fields as varied as the fields of construction and infrastructure, industrial equipment, automotive, rail or naval transport, electricity and electronics, sports and leisure, renewable energies and in particular wind power, etc. For this purpose, they can be used as they are, assembled in the form of nonwovens, or in woven or knitted form, where appropriate mixed with other types of fibres.

The carbon fibres obtained by the manufacturing method according to the invention can advantageously be used, thanks to their low cost, to replace glass fibres in applications requiring the use of reinforcing fibres of moderate tensile strength and of a low production cost. For example, the carbon fibres obtained by the method according to the invention can be used to manufacture structures in the field of construction or renewable energy production, such as wind or marine turbine blades, for replacing all or part of the glass fibres that have been used therein until now. The carbon fibres according to the invention can, for example, be used to replace 5 to 40%, in particular 10 to 30%, of these glass fibres.

The present invention thus relates in particular to a wind turbine blade, or a marine turbine blade, of large dimensions, i.e. of at least 30 metres in length, and typically of 40 to 100 metres in length, formed from a composite material made of reinforcing fibres dispersed in a polymer resin matrix, and comprising, as reinforcing fibres for the blade, the latter typically being formed of two half-blades, between 5 and 40%, and preferably between 10 and 30%, of carbon fibres derived from cellulose obtained by a manufacturing method according to the invention, the remainder of the reinforcing fibres being constituted by glass fibres. The density of these cellulose-derived carbon fibres is preferably advantageously comprised between 1.3 and 1.8 $g/m^3$, whereas the density of glass fibres is equal to about 2.2 $g/m^3$. The above percentage of carbon fibres derived from cellulose obtained according to the invention, with respect to the total quantity of reinforcing fibres, is defined for the reinforcing fibres of the airfoil of the blade, and is understood to be in addition to the percentage of carbon fibres comprised in the spar made of a resin-carbon composite (commonly referred to as a "spar cap"), which is incorporated for large blades inside the blade, in the volume defined by the half-blades. The percentage and the distribution of the carbon fibres derived from cellulose in the blade are calculated in particular according to several criteria: the dimensions and mechanical properties, the weight, the bulk, the energy of the motor, and the target power of the wind turbine (advantageously 3 to 8 MW).

The resulting blades for wind turbines or similar structures (for example marine turbines) allow to reduce, for target length and mechanical properties, the power required from the motors of the structure.

The method according to the invention can further comprise one or more of the features described hereinbelow, implemented alone or according to any technically possible combination thereof.

The grinding/shredding of the paper product implemented in step a1/ of the method according to the invention can be carried out according to any method known to a person skilled in the art, for example by means of a mill/shredder that is conventional in itself. Preferably, in step a1/ grinding is carried out in such a way as to obtain a ground material formed of particles, the largest dimension whereof is comprised between 100 and 1,000 µm, preferably between 200 and 500 µm. These particles are preferably non-agglomerated.

This step can be preceded by various operations of cleaning and/or dusting the paper product, as well as cutting operations.

The ground material thus obtained is directly dissolved in the spinning solution.

The method according to the invention is thus particularly advantageous compared to the methods proposed in the prior art for preparing cellulose intended for the manufacture of carbon fibres from lignocellulosic biomass, which include advanced purification steps. The time and cost required to manufacture carbon fibres by the method according to the invention are thus much lower than those of conventional methods for preparing carbon fibres from lignocellulosic biomass. In particular, the cost of the cellulosic raw material subjected to the spinning step is significantly lower than that of conventional methods for preparing carbon fibres.

Alternatively, a method for manufacturing a carbon fibre can comprise, without it being absolutely necessary, after step a1/ of grinding the paper product, and before step a3/ of preparing the spinning solution, a step a2/ of pre-treating the ground material obtained so as to reduce the mineral filler content thereof, preferably to a value of less than or equal to 1%, and preferentially to a value of less than or equal to 0.3%. The mineral filler content of the ground material can be determined before, during and after the pre-treatment step, by thermal gravimetric analysis, in a manner conventional in itself for a person skilled in the art, for example in air at a temperature comprised between 500° C. and 1,000° C.

Step a2/ of pre-treating the ground material can be carried out by any conventional process for purifying paper in order to retain substantially only the cellulose.

Step a2/ of pre-treating the ground material can comprise pulping this ground material so as to obtain a paper pulp which is then successively subjected to hyperwashing, drying and grinding. These steps can each be carried out by any method known to a person skilled in the art.

The pulping of the ground paper material can, for example, be carried out by means of a pulper, for example of the type provided with a cross-blade, of the drum pulper type or of the helical pulper type, in which the ground material suspended in an aqueous solution is stirred, for example for a period of about 15 minutes. The ground material can have been left to soak in the aqueous solution beforehand, for example for a period comprised between 15 minutes and 4 hours. This aqueous solution can optionally contain one or more additives, such as sodium hydroxide, hydrogen peroxide, silicates, fatty acids and/or any other de-inking additive.

In the step of pulping the ground paper material, the paper is broken up mechanically and the cellulose fibres contained therein are placed in aqueous suspension. This step is preferably carried out under conditions that allow a pulp containing about 2 wt % of paper to be obtained.

The hyperwashing step globally consists in cleaning the paper pulp with a large quantity of water, in order to only retain the cellulose fibres contained therein and to remove therefrom the mineral fillers and other contaminants.

Hyperwashing can, for example, be carried out using a diffuser, into whose screen the pulp is placed and then washed with a large quantity of water until the washing water runs clear. Alternatively, hyperwashing can be carried out by means of a centrifugal dewatering machine, i.e. a rotating drum inside which a cloth pouch containing the paper pulp is placed. Water is injected into the rotating drum. Such an implementation has the particular advantages of allowing larger quantities of pulp to be hyperwashed, as well as the pulp to be dewatered as it is cleaned, which procures a pulp containing a smaller quantity of water.

Any other conventional hyperwashing method can otherwise be implemented.

Where appropriate, the hyperwashing step can be followed by a step of concentrating the cellulose pulp, for example by centrifugation or filtration; and/or by a step known as fluffing the pulp, consisting in mechanically opening the structure thereof.

The drying of the resulting pulp can be carried out, for example, in an oven. Preferably, it is carried out until a pulp moisture content of less than 20%, preferably less than 10%, is achieved. When the initial moisture content of the pulp is very high, the oven-drying can be preceded by pulp dewatering, in particular in a rotary drum, so as to reduce the moisture content to a value of less than or equal to about 60%.

The moisture content is herein defined conventionally, as the mass percentage of water contained in the pulp, based on the total mass of the pulp, under conditions of 60% relative air humidity and at about 20° C. In particular, this moisture content can be determined by comparing the weight of a pulp sample with the weight of the same sample after it has been subjected to a drying step at more than 100° C. until a substantially constant sample weight is obtained.

After drying, the paper pulp can be mechanically ground/shredded to form a ground material from which step a3/ of the method according to the invention is carried out in order to form the spinning solution.

In the configurations wherein the product is formed from an inked paper, a method for manufacturing a carbon fibre can comprise, after the pulping step, a step of flotation of the paper pulp, in order to remove the inks contained therein. This flotation step can be carried out by any method known to a person skilled in the art.

In the method according to the invention, which does not comprise such a step a2/ of pre-treating the ground paper material, the implementation of the solvent spinning step is advantageously just as easy and the manufacturing yield of a carbon fibre is just as high, compared to methods comprising such a pre-treatment step. The method according to the invention thus advantageously combines speed, efficiency and a low cost.

Preferably, the ground material dissolved in the solvent solution in step a3/ of the method according to the invention contains more than 90 wt %, preferably more than 95 wt %, of cellulose based on the total weight of the ground material. The water content thereof is preferably less than or equal to 15 wt %, based on the total weight of the ground material. The mineral content thereof is preferably less than or equal to 0.3 wt %, and preferentially less than or equal to 0.1 wt %, based on the total weight of the ground material. Such a feature advantageously improves the mechanical properties of the carbon fibre obtained by the method according to the invention.

The paper product which the method according to the invention uses can be formed by recycled paper.

Alternatively, it can be formed by paper derived from a chemical papermaking pulp, in particular a kraft pulp or a bisulphite pulp. It is, for example, a writing or printing paper. Chemical paper pulps are obtained by cooking wood with chemicals. Two main methods exist: the acid method, which produces a bisulphite pulp, and the kraft method, which comprises cooking the wood in a liquor containing sodium hydroxide and sodium sulphide.

Step a3/ of dissolving the ground material obtained at the end of step a1/ of the method uses an aqueous phosphoric acid solution as a solvent solution for the cellulose.

Conventional alternative solvent solutions are zinc chloride solutions, formic acid, N-methylmorpholine-N-oxide (NMMO), ionic liquids, or any mixture thereof that is technically possible.

As a solvent solution, an aqueous phosphoric acid solution, preferably with a phosphoric acid concentration of 75 to 99 vol %, based on the total volume of the aqueous solution, surprisingly allows, by itself, carbon fibres with particularly advantageous mechanical properties to be obtained from a manufactured paper product, which is subjected to a simple grinding step before being dissolved in the solvent solution.

The dissolution of the ground material in the solvent solution can be assisted by heat treatment, for example by heating under reduced pressure and then cooling to a very low temperature, in a conventional manner.

However, this heat treatment is preferably limited to a temperature of less than or equal to 45° C.

More generally, in step a/ of preparing a cellulose-based fibre, the temperature applied to the cellulose does not exceed 45° C. This results in particularly good mechanical properties of the final carbon fibre, with the advantage of low energy consumption.

In specific implementations of the invention, the spinning solution is subjected to the solvent spinning process without a prior drying step intended in particular to remove water therefrom. The number of steps in the method according to the invention is thus advantageously minimised.

The spinning solution is preferably not subjected to any further steps prior to the spinning itself, with the exception of the incorporation, into this solution, of additional ingredients as described hereinbelow. It can also optionally be subjected to a filtration. In preferred embodiments of the invention, the spinning solution is not filtered prior to spinning.

In preferred embodiments of the invention, in step a3/ of dissolving the ground material in the solvent solution, consisting of the aqueous phosphoric acid solution, the ground material is mixed with purified cellulose.

The term purified cellulose is understood herein to mean cellulose obtained from lignocellulosic biomass, in particular so-called paper cellulose, i.e. cellulose obtained from a paper-making process and having a higher degree of purity than the cellulose contained in the ground material obtained according to the invention. Purified cellulose is commonly used in prior art methods for the manufacture of carbon fibres.

The purified cellulose used in the context of the present invention can be obtained from hardwood or softwood, from annual plants, such as straw or cotton, etc. It can have been obtained by any conventional method, for example by a kraft or sodium hydroxide cooking method.

In the mixture of ground material and purified cellulose incorporated into the spinning solution, the purified cellulose is preferably present in an amount comprised between 20 and 90 wt %, preferably between 40 and 60 wt %, for example about 50 wt %, based on the total weight of the mixture of ground material and purified cellulose.

The total amount of ground material, or where appropriate of the mixture of ground material and purified cellulose added thereto, which is dissolved in the solvent solution in step a3/ of the method, is comprised between 1 and 50 wt %, preferably between 5 and 30 wt %, and preferentially between 5 and 20 wt %, for example between 5 and 15 wt %, based on the total weight of the spinning solution obtained.

Thus, in step a3/ of the method according to the invention, the concentration of ground material, or where appropriate of the mixture of ground material and purified cellulose, dissolved in the solvent solution, is comprised between 1 and 50 wt %, preferably between 5 and 30 wt %, and preferentially between 5 and 20 wt %, for example between 5 and 15 wt %, based on the total weight of the spinning solution obtained.

The ground paper or paper pulp material can also be mixed with substances other than purified cellulose, for example with polyacrylonitrile, advantageously allowing carbon fibres with further improved mechanical properties to be obtained, in particular with a tensile strength of greater than 4,000 MPa after graphitisation. These mechanical properties make them particularly suitable for use in applications where a very high material strength is required, for example to manufacture hydrogen tanks.

The method according to the invention can comprise the addition of one or more additives to the spinning solution, in order to better structure the material, improve the mechanical properties of the fibres formed, etc.

Each of these additives can in particular be present in the spinning solution at a content comprised between 1 ppm and 10 wt %, based on the total weight of the spinning solution, preferably between 1 ppm and 5 wt %, for example between 100 ppm and 1 wt %, based on the total weight of the spinning solution.

Examples of additives that can be added to the spinning solution according to the invention include compatibilising agents, such as maleic anhydride grafted polymers or co-polymers. Examples in particular include Lotader® 3300 marketed by Arkema, or Beiwa® 901 from DzBh.

In specific embodiments of the invention, the spinning solution contains a non-ionic emulsifying agent, preferably at a concentration comprised between 0.1 and 1 wt %, for example about 0.2 wt %, based on the weight of ground material, where appropriate based on the weight of the mixture of ground material and purified cellulose, dissolved in said solvent solution in said step a3/. The spinning solution can for example contain one or more emulsifying agents sold under the name Emulan® by BASF.

The spinning solution can be filtered to remove solid particles therefrom before carrying out the next step of the method according to the invention.

In specific implementations of the invention, one or more nanosized carbonaceous fillers are added to the spinning solution during step a3/ of the method according to the invention, or immediately therebefore or thereafter. The nanosized carbonaceous fillers are preferably added to the spinning solution in an amount comprised between 1 ppm and 30 wt %, based on the weight of the ground material, where appropriate based on the weight of the mixture of ground material and purified cellulose, dissolved in the solvent solution in step a3/. This concentration is preferentially comprised between 0.001 and 5 wt %, and in particular between 0.01 and 5 wt %.

The phrase "nanosized carbonaceous filler" is understood herein to mean a filler comprising an element of the group consisting of single- or multi-walled carbon nanotubes, carbon nanofibres, graphene, graphene oxide, reduced graphene oxide, fullerenes, cellulose nanofibrils, cellulose nanocrystals and carbon black, or any mixture of such elements. Preferably, the nanosized carbonaceous fillers incorporated into the spinning solution according to the invention are carbon nanotubes, alone or in a mixture with graphene. Carbon nanotubes are for example marketed by Arkema under the name Graphistrength®.

The nanosized carbonaceous fillers according to the present invention can have a smaller dimension comprised between 0.1 and 200 nm, preferably between 0.1 and 160 nm, and preferentially between 0.1 and 50 nm. This dimension can, for example, be measured by light scattering.

The term "graphene" is understood according to the present invention to mean a planar, isolated and individualised graphite sheet, but also, by extension, an assembly comprising between one and several tens of sheets and having a planar or more or less corrugated structure. This definition thus encompasses FLGs (Few Layer Graphenes), NGPs (Nanosized Graphene Plates), CNS' (Carbon NanoSheets) and GNRs (Graphene NanoRibbons). However, it excludes carbon nanotubes and nanofibres, which are respectively constituted by the coaxial winding of one or more graphene sheets and the turbostratic stacking of these sheets.

The nanosized carbonaceous fillers are preferably incorporated into the spinning solution according to the invention in the form of a liquid dispersion, which can be aqueous or solvent-based.

The dispersion of the nanosized carbonaceous fillers can be carried out by an ultrasonic probe, a ball mill, a high shear mixer, or any other device conventionally used, and where appropriate in the presence of a surfactant.

The spinning process implemented in step a4/ of the method according to the invention, to form a continuous cellulose fibre, can be of any type known to a person skilled in the art.

As described hereinabove, in this step the spinning solution is injected through a spinneret consisting of one or more holes into a coagulation bath, either statically or in-flow, directly into the bath (wet-spinning) or through an air gap (dry-jet wet spinning). On contact with the coagulation bath, the fibre solidifies. This advantageously produces a cellulose-based continuous fibre.

The coagulation bath used can have any conventional composition that is compatible with the phosphoric acid in the spinning solution and the specific type of solvent spinning process implemented.

For example, the coagulation bath can be made of isopropanol, water, acetone, or any other solvent that allows for coagulation of the cellulose on contact therewith, or any mixtures thereof.

Alternative conventional solvent spinning processes include the viscose process, the Lyocell process, or processes using ionic liquids as a solvent for the spinning solution. Specific examples of conventional solvent spinning processes are in particular described in the documents WO 85/05115, U.S. Pat. Nos. 5,817,801, 5,804,120, or the publications by Boerstel, 2001, in *Polymer*, 42: 7371-7379, or by Swatloski, 2002, in *JACS*, 124: 4974-4975.

In a specific embodiment of the invention, the spinning solution is formed from phosphoric acid, where appropriate in the presence of a non-ionic emulsifier, and the coagulation bath is formed of isopropanol, alone or in a mixture with water. The cellulose-based continuous fibre obtained by the spinning process according to the invention, which can take the form of a monofilament or multifilaments, can then be washed and dried.

Optionally, it is subjected to a drawing step a5/ to form a fibre of greater length.

The fibre drawing step can be carried out according to any method and by means of any equipment known to a person skilled in the art for carrying out such an operation. In particular, it can be carried out at a temperature that causes the material making up the fibres to soften. For this purpose, the fibres pass successively over a table of so-called feed rollers, through a furnace heated to said temperature, and then over a table of so-called drawing rollers. They undergo drawing between the two tables of rollers, according to the ratio of the rotational speeds of the feed rollers and of the drawing rollers. Alternatively, they can be drawn on heated rollers rotating at different speeds. Such drawing advantageously aligns the polymer chains along the fibre axis.

The fibres can optionally be treated at the end of the spinning process, with radiation, such as gamma rays, beta rays, electron beams or UV rays.

The resulting cellulose-based fibre, which can be of considerable length, can then be wound, for example on a cardboard tube.

The cellulose-based fibre obtained according to the present invention can then be sized, in a conventional manner, before being subjected to the carbonisation step in order to obtain a continuous carbon fibre.

According to an alternative embodiment of the invention, the nanosized carbonaceous fillers are introduced into the sizing bath, and not into the spinning solution as described hereinabove.

The step b/ of carbonising the cellulose-based continuous fibre of the method according to the invention is carried out in a conventional manner, using any combination of operating parameters described in the prior art for carbonising cellulose fibres.

It is preferably carried out in an inert atmosphere.

Carbonisation can be carried out continuously, with the fibre running through the carbonisation furnace, or discontinuously, i.e. in a static mode, with the fibre preferably being kept under tension in the furnace.

Prior to carbonisation, the cellulose-based continuous fibre can be impregnated with one or more additives, in particular so-called carbonising agents, which help to increase the mechanical properties of the carbon fibre ultimately obtained and to increase the carbon yield of the carbonisation step. These additives are conventional in themselves. By way of example, the cellulose-based fibre can be impregnated with one or more of the following additives: Brønsted acid compounds or compounds which release Brønsted acids on heating, in particular hydrogen halides, halides having any counterion, such as sodium, potassium, or ammonium, etc., sulphuric acid, sulphates having any counterion, such as sodium, potassium, or ammonium, etc., organic sulphonic acids bearing an alkyl group, such as methylsulphonic acid, or an aryl group, such as paratoluenesulphonic acid, or any other organic group, organic sulphonates corresponding to the above sulphonic acids and having any counterion, such as sodium, potassium, or ammonium, etc., phosphoric acid and polyphosphoric acids, and/or phosphates and polyphosphates having any counterion, such as sodium, potassium, or ammonium etc.; Lewis acid compounds, in particular boric acid and/or metal halides such as aluminium chloride $AlCl_3$ or iron chloride $FeCl_2$; urea; nanosized carbonaceous fillers; and/or formulations having a siliconised polymer base, for example having a polydimethylsiloxane base, in particular in combination with a crosslinking agent. Such a list by no means limits the invention.

Impregnating additives based on siliconised polymers are particularly preferred in the context of the present invention, since they enable the mechanical properties of the carbon fibre obtained according to the invention to be improved even further. The impregnating additives of the siliconised type are preferably used at a rate, defined as the weight percentage of additive deposited based on the total weight of the cellulose fibre and of the additive, comprised between 0.01 and 20 wt %, preferably between 0.5 and 10 wt %, and more preferentially between 1 and 5 wt %.

Carbonisation can be carried out at a temperature comprised between 1,000 and 1,500° C., and may or may not be preceded by a stabilisation step in air at a temperature of about 250° C.

In specific implementations of the invention, the carbonisation furnace is hermetically sealed and placed under a vacuum to a value of less than $1 \cdot 10^4$ Pa (0.1 bar). It is then filled with an inert gas, such as nitrogen or argon, etc., and a gas leak is created so that the gas flow rate is comprised between 50 and 500 furnace volume changes per hour. The pressure in the furnace is preferably comprised between $1 \cdot 10^3$ Pa and $5 \cdot 10^4$ Pa above atmospheric pressure. The temperature applied in the carbonisation furnace is preferably comprised between 800° C. and 1,500° C.

This carbonisation treatment produces a carbon fibre.

This carbon fibre can then be subjected, optionally, to a graphitisation treatment, in order to obtain a better structuring of the carbon, and thus more advantageous mechanical properties. This treatment can, for example, be carried out by heating the fibre to a temperature comprised between 2,000 and 3,000° C., in an inert gas, for example for a period comprised between 30 seconds and 10 minutes.

The cellulose-based fibre according to the invention can otherwise be carbonised continuously, by passing it successively through various furnaces, including a carbonisation furnace under an inert atmosphere at a temperature comprised between 800° C. and 1,500° C., then a graphitisation furnace at a temperature of up to 2,500° C. The speed at which the fibre passes through these furnaces is thus preferentially between 0.1 and 10 m/h.

The carbon fibre obtained using the method according to the invention can have a diameter comprised between 5 and 30 µm, and a length of several metres.

In particular embodiments of the invention, the method comprises a step of forming a web of cellulose-based fibres from a plurality of cellulose-based continuous fibres obtained in step a4/ or a5/. Step b/ of carbonising this cellulose-based continuous fibre is then carried out by carbonising the web of cellulose-based continuous fibres to form a carbon fibre-based web.

The web formed from the cellulose-based fibres according to the invention can be of any shape and size. The fibres can be arranged in fabrics of different weights and weaves, for example taffeta, twill or satin, etc., used singly or in combinations, or in nonwovens, for example in which the fibres are all oriented in the same direction, or in which the fibres are randomly oriented, such as nonwoven cloths, felts or films. These are known as unidirectional webs.

The cellulose-based continuous fibres according to the invention can be used in the web alone or in combination with other types of fibres.

The carbonisation of the web of cellulose-based continuous fibres can be carried out according to any carbonisation process known to a person skilled in the art, either statically or in a continuous movement through a carbonisation furnace. The features described hereinabove with reference to the treatment of the individual fibres apply in a similar way for the carbonisation of the web of cellulose-based continuous fibres according to the invention.

The webs of cellulose-based continuous fibres according to the invention can be carbonised individually, or as a stack of webs, laid flat or where appropriate after shaping to a desired shape.

Another aspect of the invention relates to a carbon fibre obtained by a method according to the invention, that has one or more of the aforementioned features.

This carbon fibre is continuous and can have a diameter comprised between 1 and 1,000 µm, preferably between 15 and 30 µm, and a length of several metres.

It can advantageously have a tensile strength greater than 1,200 MPa, preferably greater than or equal to 2,000 MPa after graphitisation, and/or a Young's modulus greater than 75 GPa, preferably greater than or equal to 200 GPa after graphitisation, these parameters being measured in accordance with method B of the international standard ISO 11566.

Another aspect of the invention relates to a cellulose-based continuous fibre obtained as an intermediate product when implementing a method for manufacturing a carbon fibre according to the invention, at the end of step a/ of this method. This cellulose-based fibre is made from recycled paper products, either alone or mixed with other constituents, as listed hereinabove.

This cellulose-based continuous fibre can have a diameter comprised between 10 and 30 µm, and/or a strength comprised between 10 and 40 cN/tex, and/or a Young's modulus comprised between 10 and 30 GPa, these parameters being measured in accordance with the international standard ISO 2062.

It can advantageously be stored and transported.

According to another aspect, the present invention relates to a carbon fibre web obtained from carbon fibres according to the invention, said carbon fibres being woven or knitted together or being juxtaposed therein in the form of a nonwoven.

Another aspect of the invention relates to a carbon fibre web obtained by a method for manufacturing a carbon fibre according to the invention, which method includes a step of forming a web of cellulose-based fibres from a plurality of cellulose-based continuous fibres obtained in step a4/ or a5/ of the method, and a step of carbonising said web of cellulose-based continuous fibres, to form a carbon fibre-based web.

The invention further relates to a three-dimensional fibrous structure obtained by stacking a plurality of webs of cellulose-based continuous fibres according to the invention, or by stacking a plurality of carbon fibre webs according to the invention, which, where appropriate, are shaped to the desired shape, for example to form a preform for the manufacture of an article made of composite material containing reinforcing fibres distributed in a binder.

According to another aspect, the present invention relates to the use of a carbon fibre or of a carbon fibre web according to the invention for the manufacture of an article made of composite material containing carbon fibres distributed in an organic polymer resin matrix.

Another aspect of the invention further relates to a method for manufacturing an article made of composite material containing carbon fibres distributed in an organic polymer resin matrix, which method comprises: implementing a method for manufacturing a carbon fibre according to the invention, comprising manufacturing a carbon fibre by the carbonisation of an individual cellulose-based continuous fibre, and the formation of a carbon fibre web from a plurality of the carbon fibres thus obtained; or implementing a method for manufacturing a carbon fibre according to the invention, comprising forming a web of cellulose-based continuous fibres and carbonising this web of fibres to form a carbon fibre-based web; and manufacturing an article made of composite material from a plurality of the carbon fibre webs thus obtained.

The manufacture of an article made of composite material from a plurality of carbon fibre webs obtained in accordance with the present invention can be carried out according to any method that is conventional to a person skilled in the art.

A composite material is defined in this description in a conventional manner, i.e., as consisting of the assembly of a plurality of different materials or elementary components bonded together, more particularly of long and mechanically strong fibres, in this case carbon fibres, distributed in an organic polymer resin matrix. The term resin is used herein to define a polymeric compound, which can be of the thermoplastic or thermosetting type, which acts as a structural adhesive in which the fibres are dispersed in a more or less organised manner. The composite material thus formed has its own mechanical properties, which are highly advantageous in terms of mechanical strength and lightness.

Diagrammatically, the manufacture of such a composite material consists of moulding a stack of a plurality of webs of carbon fibres impregnated with non-polymerised organic resin into the desired shape under conditions, particularly temperature conditions, which cause this resin to polymerise.

The article made of composite material according to the invention can, for example, be manufactured using the technique of draping plies pre-impregnated with resin, at least some of these plies being constituted by the carbon fibre webs according to the invention, and then polymerising the assembly in an autoclave so as to form, in a conventional manner, the composite material; or by resin injection or infusion techniques, in particular by the resin transfer moulding (RTM) technique, on dry fibre plies, some of these plies consisting of the carbon fibre webs according to the invention. The composite material manufactured according to the present invention can be of the monolithic and/or sandwich type, for example with a honeycomb structure.

The fibres can be arranged therein in fabrics of different weights and weaves, for example taffeta, twill, satin, etc., used alone or in combinations, or in nonwovens, for example in which the fibres are all oriented in the same direction.

The carbon fibres obtained in accordance with the present invention can be implemented therein alone, or in combination with one or more other types of fibres, any configuration of such a combination falling within the scope of the present invention. Any conventional resin can be used in the context of the invention, in particular resins of the thermosetting type, for example epoxy resins, phenolic resins or a mixture thereof, or else thermoplastic resins.

According to another aspect, the present invention relates to an article made of composite material containing carbon fibres distributed in an organic polymer resin matrix obtained by a manufacturing method according to the invention, meeting one or more of the aforementioned features.

Such an article made of composite material can advantageously be used in many fields.

DESCRIPTION OF THE PREFERRED EMBODIMENTS

The features and advantages of the invention will be better understood in light of the examples provided hereafter for illustrative purposes only and in no way limiting the scope of the invention.

Comparative Example 1—Office Paper

By way of example, a method for manufacturing a carbon fibre is implemented using a paper product, such as office paper for printing and writing (A4 Clairefontaine Clairalpha 80 g/m² paper).

The fillers contained in this paper are firstly removed. To do this, the paper is subjected to the following procedure.

The sheets of paper are firstly shredded in an automated manner.

The resulting shreds are then subjected to a pre-treatment to reduce the mineral filler content thereof as well as other impurities. To do this, they are placed in a pulper with water to form a paper pulp suspended in water at 20 g/L dry matter. This pulp is cleaned three times with a pressurised water jet on a 50 µm screen (hyperwashing), until the water runs clear. The hyperwashed pulp is then oven-dried at 95° C. for one night and then ground to form particles with dimensions no larger than about 250 µm.

Thermal gravimetric analyses at the different steps of this method allow the efficiency thereof to be controlled, by determining the mineral filler content of the material. For this purpose, a sample of material is firstly subjected to a temperature of 500° C. in air, in order to determine the general mineral filler content thereof; then to a temperature of 900° C. in air, in order to determine the proportion of carbonate in these mineral fillers. The initial paper is thus determined to contain 14% mineral fillers (made of 94% carbonates) and 5% water. At the end of the pre-treatment, the mineral filler content of the ground paper pulp is less than 1%.

The ground paper pulp is then dissolved in phosphoric acid to the amount of 10 wt % based on the total weight of the mixture.

To this solution is added an aqueous dispersion of carbon nanotubes, formed by means of a reactor connected to a ball mill and to an ultrasonic probe, by dispersing carbon nanotubes at the amount of 0.9 wt %, in the presence of the surfactant marketed as Brij® S20 at a concentration of 1.2 wt %, in water.

This aqueous dispersion is added to the spinning solution at the amount of 0.1 wt % based on the weight of ground pulp contained in the spinning solution. The dissolution quality is checked by optical microscopy and by viscosity measurements. This dispersion does not contain any aggregates having a size greater than or equal to 1 µm. A non-ionic emulsifier, such as the product marketed as Emulan®, is also added to this solution at the amount of 0.2 wt % based on the weight of ground pulp contained in the spinning solution. Such a non-ionic emulsifier advantageously facilitates the impregnation of the cellulose of the recycled paper by the phosphoric acid.

The mixture is heated at 45° C. for 15 min under a reduced pressure of 100 mbar and with stirring at 40 rpm, then cooled for 3 h at −10° C. under the same reduced pressure and stirring. It is then placed at 0° C. for one night, still under the same conditions of reduced pressure and stirring, and is finally cooled at −10° C.

The resulting spinning solution is extruded through a spinneret with 500 holes each measuring 80 µm in diameter, and injected directly into a coagulation bath consisting of an isopropanol/water mixture (60:40 by volume).

The spinning parameters are, for example: temperature of the spinning solution 0° C., speed of the transfer pump 800 rpm, temperature of the coagulation bath 20° C.

In the coagulation bath, cellulose fibres are formed, in which the carbon nanotubes are trapped and well dispersed.

The fibres thus formed are passed through a neutralisation bath, comprising potassium hydroxide KOH, at 20° C., in order to remove the phosphoric acid remaining on the fibres, then through a water washing bath at 15° C., before being dried by hot air in a furnace at 250° C.

They are then drawn on heated rollers at a temperature of 160° C., in a conventional manner.

The cellulose-based fibres are then wound into a spool at a winding speed of 12 m/min. This results in a cellulose-based multifilament fibre with a diameter of about 25 µm and a length of several metres.

This cellulose-based continuous fibre has a strength comprised between 10 and 40 cN/tex and a Young's modulus comprised between 10 and 30 GPa (these parameters being measured according to the protocols described in the international standard ISO 2062).

This cellulose-based continuous fibre can then be subjected to a stabilisation step in air at a temperature of about 250° C., prior to a carbonisation step in nitrogen up to 1,200° C. This method produces a carbon fibre having, in the non-graphitised state, a tensile strength greater than 1,200 MPa and a Young's modulus greater than 75 GPa (these parameters being measured according to the protocols described in method B of the international standard ISO 11566).

Example 1—Office Paper

A method for manufacturing a carbon fibre in accordance with the invention is carried out using the same paper product as that used in the Comparative Example 1 hereinabove, office paper for printing and writing (A4 Clairefontaine Clairalpha 80 g/m² paper).

The sheets of paper are firstly shredded in an automated manner. The resulting shreds are ground to form particles with a dimension of about 250 µm.

In accordance with the invention, the ground paper is then directly dissolved in an 85% aqueous phosphoric acid solution (containing a concentration of phosphoric acid of 85 vol % based on the total volume of said aqueous solution), at the amount of 7 wt % based on the total weight of the mixture, to form a spinning solution.

A non-ionic emulsifier, such as the product marketed as Emulan®, is added to this solution at the amount of 0.2 wt % based on the weight of ground paper contained in the spinning solution. Such a non-ionic emulsifier advantageously facilitates the impregnation of the cellulose of the recycled paper by the phosphoric acid.

The mixture is heated to 45° C. for 15 min under a reduced pressure of 100 mbar and with stirring at 40 rpm, then cooled for 3 h to −10° C. under the same reduced pressure and stirring. It is then placed at 0° C. for one night, still under the same conditions of reduced pressure and stirring, and is finally cooled to −10° C.

In an alternative embodiment of the method, the ground paper can be mixed in the phosphoric acid solution with cellulose from wood obtained by a paper-making process, of a higher degree of purity, for example in a weight ratio of ground paper to high-purity cellulose of 20:80 or 50:50.

The spinning solution is extruded through a spinneret with 500 holes each measuring 80 µm in diameter, and injected directly into a coagulation bath consisting of an isopropanol/water mixture (60:40 by volume).

The spinning parameters are, for example: temperature of the spinning solution 0° C., speed of the transfer pump 600 rpm, temperature of the coagulation bath 20° C. Cellulose fibres are formed in the coagulation bath.

The fibres thus formed are passed through a neutralisation bath, comprising potassium hydroxide KOH at 3 wt % in water, at 20° C., in order to remove the phosphoric acid remaining on the fibres, then through a water washing bath at 15° C., before being dried by hot air in a furnace at 250° C.

They are then drawn on heated rollers at a temperature of 160° C., in a conventional manner.

The cellulose-based fibres are then wound into a spool at a winding speed of 10 m/min. This results in a cellulose-based multifilament fibre with a diameter of about 28 µm and a length of several metres.

This cellulose-based continuous fibre has a strength comprised between 10 and 40 cN/tex and a Young's modulus comprised between 10 and 40 GPa (these parameters being measured according to the protocols described in the international standard ISO 2062).

This cellulose-based continuous fibre can then be subjected to a stabilisation step in air at a temperature of about 250° C., prior to a carbonisation step in nitrogen up to 1,200° C. Prior to the carbonisation step, the cellulose-based continuous fibre can be impregnated with so-called carbonising agents, which help to increase the mechanical properties of the carbon fibre ultimately obtained and the carbon yield of the carbonisation step.

The carbonisation step can be followed by a graphitisation step, by heating the fibre at a temperature comprised between 2,000 and 3,000° C., in an inert gas, for a period comprised between 1 and 10 minutes.

This method produces a carbon fibre having particularly satisfactory mechanical properties, in particular, in the non-graphitised state, a tensile strength greater than 1,200 MPa and a Young's modulus greater than 75 GPa (these parameters being measured according to the protocols described in method B of the international standard ISO 11566). These mechanical properties are as good as those of the carbon fibres obtained in the Comparative Example 1, in which the ground paper material was subjected to a pre-treatment before being dissolved in the aqueous phosphoric acid solution.

Furthermore, without additives, the carbon fibre obtained according to the invention has a carbon yield of 15.4% at 1,000° C. in nitrogen and an inorganic content of less than 0.007% (these parameters being measured by thermal gravimetric analysis at 10° C./min in nitrogen up to 1,000° C. and then by passage into an air atmosphere at 1,000° C.). This carbon fibre was obtained at a very low cost, compared to the carbon fibres formed by the conventional methods proposed in the prior art.

This carbon fibre can be used for many applications, for example for the manufacture of articles made of composite material, in which said fibres are dispersed in an organic polymer resin.

Example 2—Paper Towels

A method for manufacturing a carbon fibre according to the invention is carried out using paper towels.

This paper is ground before being dissolved in phosphoric acid (85% aqueous solution) at the amount of 7 wt %, based on the total weight of the mixture.

A non-ionic emulsifier, such as the product marketed as Emulan®, is added to this solution at the amount of 0.2 wt % based on the weight of ground pulp contained in the spinning solution.

The mixture is heated at 45° C. for 30 min under a reduced pressure of 100 mbar and with stirring at 40 rpm, then cooled at −10° C. under the same reduced pressure and stirring for one night.

The resulting spinning solution is extruded through a spinneret with 500 holes each measuring 80 µm in diameter, and injected directly into a coagulation bath consisting of an isopropanol/water mixture (60:40 by volume).

The spinning parameters are, for example: temperature of the spinning solution 0° C., speed of the transfer pump 600 rpm, temperature of the coagulation bath 20° C. Cellulose fibres are formed in the coagulation bath.

The fibres thus formed are passed through a neutralisation bath, comprising potassium hydroxide KOH, at 20° C., in order to remove the phosphoric acid remaining on the fibres, then through a water washing bath at 15° C., before being dried by hot air in a furnace at 260° C.

They are then drawn on heated rollers at a temperature of 120° C., in a conventional manner.

These cellulose fibres are then subjected to a carbonisation step, according to the protocol indicated in example 1 hereinabove.

The invention claimed is:

1. Method for manufacturing a carbon fibre from a manufactured paper product comprising about 70-85 wt % cellulose fibres extracted from wood, comprising:
   a/ preparing a cellulose-based fibre, comprising the successive steps of:
   a1/ grinding said paper product to obtain a ground paper material,
   a3/ directly dissolving the ground material obtained at the end of step a1/ in an aqueous phosphoric acid solution to form a so-called spinning solution,
   a4/ using said spinning solution to manufacture a cellulose-based continuous fibre by implementing a solvent spinning process,
   a5/ optionally drawing the resulting cellulose-based continuous fibre,
   b/ and carbonising said cellulose-based continuous fibre to form a carbon fibre.

2. The method for manufacturing a carbon fibre according to claim 1, wherein the spinning solution is subjected to said solvent spinning process without being subjected to a prior drying step.

3. The method for manufacturing a carbon fibre according to claim 1, wherein said aqueous phosphoric acid solution contains a concentration of phosphoric acid comprised between 75 and 99 vol %, based on the total volume of said aqueous solution.

4. The method for manufacturing a carbon fibre according to claim 1, wherein, in step a/ of preparing a cellulose-based fibre, the temperature does not exceed 45° C.

5. The method for manufacturing a carbon fibre according to claim 1, wherein, in step a1/ the grinding is carried out in such a way as to obtain a ground material formed of particles, the largest dimension whereof is comprised between 200 and 500 µm.

6. The method for manufacturing a carbon fibre according to claim 1, wherein said paper product is formed of paper derived from a chemical papermaking pulp.

7. The method for manufacturing a carbon fibre according to claim 1, wherein, in step a3/ the ground material is mixed with purified cellulose.

8. The method for manufacturing a carbon fibre according to claim 1, wherein, in step a3/ the concentration of ground material dissolved in the aqueous phosphoric acid solution is comprised between 1 and 50 wt % based on the total weight of the spinning solution.

9. The method for manufacturing a carbon fibre according to claim 1, wherein the spinning solution contains a non-ionic emulsifying agent.

10. The method for manufacturing a carbon fibre according to claim 1, wherein a nanosized carbonaceous filler is added to the spinning solution.

11. The method for manufacturing a carbon fibre according to claim 1, comprising of step forming a web of cellulose-based fibres from a plurality of cellulose-based continuous fibres obtained in step a4/ or a5/, and wherein step b/ of carbonising said cellulose-based continuous fibre is carried out by carbonising said web of cellulose-based continuous fibres to form a carbon fibre-based web.

12. Method for manufacturing an article made of composite material containing carbon fibres distributed in an organic polymer resin matrix, comprising:
   implementing a method for manufacturing a carbon fibre according to claim 1 and forming a carbon fibre web from a plurality of the carbon fibres obtained,
   and manufacturing said article made of composite material from a plurality of carbon fibre webs thus obtained.

13. The method for manufacturing a carbon fibre according to claim 8, wherein, in step a3/ the concentration of ground material dissolved in the aqueous phosphoric acid solution is comprised between 5 and 30 wt % based on the total weight of the spinning solution.

14. The method for manufacturing a carbon fibre according to claim 9, wherein the concentration of the non-ionic emulsifying agent in the spinning solution is comprised between 0.1 and 1 wt %, based on the weight of ground material dissolved in said aqueous phosphoric acid solution in said step a3/.

15. The method for manufacturing a carbon fibre according to claim 10, wherein the nanosized carbonaceous filler is chosen from the group consisting of carbon nanotubes and graphene, alone or mixed together.

16. The method for manufacturing a carbon fibre according to claim 10, wherein the nanosized carbonaceous filler is added to the spinning solution at a concentration comprised between 1 ppm and 5 wt %, based on the weight of the ground material dissolved in said aqueous phosphoric acid solution in said step a3/.

17. The method for manufacturing a carbon fibre according to claim 7, wherein, in step a3/ the concentration of the mixture of ground material and purified cellulose dissolved in the aqueous phosphoric acid solution is comprised between 1 and 50 wt % based on the total weight of the spinning solution.

18. The method for manufacturing a carbon fibre according to claim 7, wherein the spinning solution contains a non-ionic emulsifying agent at a concentration comprised between 0.1 and 1 wt %, based on the weight of the mixture of ground material and purified cellulose dissolved in said aqueous phosphoric acid solution in said step a3/.

19. The method for manufacturing a carbon fibre according to claim 7, wherein a nanosized carbonaceous filler is added to the spinning solution at a concentration comprised between 1 ppm and 5 wt %, based on the weight of the mixture of ground material and purified cellulose dissolved in said aqueous phosphoric acid solution in said step a3/.

20. The method for manufacturing an article made of composite material containing carbon fibres distributed in an organic polymer resin matrix, comprising:

implementing a method for manufacturing a carbon fibre according to claim 11 to form a carbon fibre-based web, and manufacturing said article made of composite material from a plurality of carbon fibre webs thus obtained.

\* \* \* \* \*